US009300799B2

(12) United States Patent
Brown et al.

(10) Patent No.: US 9,300,799 B2
(45) Date of Patent: Mar. 29, 2016

(54) METHOD, APPARATUS, AND COMPUTER-READABLE MEDIUM FOR AIDING EMERGENCY RESPONSE

(71) Applicant: BRYX, Inc., Rochester, NY (US)

(72) Inventors: Jeremy Brown, Henrietta, NY (US);
David Thomas, Rochester, NY (US);
Travis Brown, Fairport, NY (US)

(73) Assignee: BRYX, INC., Rochester, NY (US)

( * ) Notice: Subject to any disclaimer, the term of this patent is extended or adjusted under 35 U.S.C. 154(b) by 48 days.

(21) Appl. No.: 14/246,413

(22) Filed: Apr. 7, 2014

(65) Prior Publication Data

US 2015/0288819 A1 Oct. 8, 2015

(51) Int. Cl.
*H04M 3/51* (2006.01)
*G08B 25/00* (2006.01)

(52) U.S. Cl.
CPC ........... *H04M 3/5116* (2013.01); *G08B 25/006* (2013.01)

(58) Field of Classification Search
CPC  H04M 3/5116; H04M 11/04; H04M 2242/04
USPC ............ 379/37–45; 340/540, 539.13, 539.11; 455/404.1
See application file for complete search history.

(56) References Cited

U.S. PATENT DOCUMENTS

| 6,292,108 | B1 | 9/2001 | Straser et al. |
|---|---|---|---|
| 7,172,118 | B2 | 2/2007 | Urken |
| 7,221,928 | B2 | 5/2007 | Laird et al. |
| 8,290,705 | B2 | 10/2012 | Trinko et al. |
| 8,630,820 | B2 | 1/2014 | Amis |
| 2006/0212195 | A1 | 9/2006 | Veith et al. |
| 2007/0044539 | A1 | 3/2007 | Sabol et al. |
| 2008/0004904 | A1 | 1/2008 | Tran |
| 2008/0094230 | A1 | 4/2008 | Mock et al. |
| 2011/0046920 | A1 | 2/2011 | Amis |

(Continued)

FOREIGN PATENT DOCUMENTS

WO  2007-030605 A2  3/2007

OTHER PUBLICATIONS

García: "Multi-Hazard Risk Assessment: An Interdependency Approach" Aug. 2010 (206 pages) https://circle.ubc.ca/bitstream/handle/2429/27271/ubc_2010_juarezgarcia_hugon.pdf?sequence=1>.
Royal et al.: "Project Responder 3: Toward the First Responder of the Future" Mar. 2012 (139 pages) http://www.fas.org/irp/agency/dhs/fema/responder3.pdf.

(Continued)

*Primary Examiner* — Melur Ramakrishnaiah
(74) *Attorney, Agent, or Firm* — Timothy W. Menasco, Esq.; Harter Secrest & Emery LLP

(57) ABSTRACT

Presented are a method, apparatus, and computer-readable medium for aiding emergency response. The method includes receiving, by a processor, a plurality of data corresponding to a geographic location from a plurality of data sources. The method further includes aggregating, by the processor, the plurality of data. The method still further includes determining, by the processor, a first profile and a second profile based on the aggregated plurality of data. The method can conclude with transmitting, by the processor, the first profile to a plurality of user equipments and the second profile to at least one user equipment, wherein the at least one user equipment is different from the plurality of user equipments.

18 Claims, 9 Drawing Sheets

(56) References Cited

U.S. PATENT DOCUMENTS

| | | |
|---|---|---|
| 2011/0126111 A1 | 5/2011 | Gill et al. |
| 2012/0218102 A1* | 8/2012 | Bivens et al. ............ 340/539.13 |
| 2012/0256745 A1* | 10/2012 | Piett et al. .................... 340/540 |
| 2013/0110392 A1 | 5/2013 | Kosseifi et al. |
| 2013/0189946 A1 | 7/2013 | Swanson |
| 2013/0222133 A1 | 8/2013 | Schultz et al. |

OTHER PUBLICATIONS

RedNMX Alpine Software website (printed Apr. 7, 2014) http://alpinesoftware.com.

International Search Report and Written Opinion of the International Searching Authority completed Jan. 13, 2016 (9 pages).

* cited by examiner

METHOD, APPARATUS, AND COMPUTER-READABLE MEDIUM FOR AIDING EMERGENCY RESPONSE

FIELD OF THE INVENTION

Exemplary embodiments of the present disclosure relate to a method, apparatus, and computer-readable medium for aiding emergency response. The present disclosure relates more specifically to providing specialized intelligence for enhanced emergency response.

BACKGROUND OF THE INVENTION

Emergency services and rescue services are organizations that ensure public safety and health by addressing different emergencies that arise. Some of these agencies exist solely for addressing certain types of emergencies while others deal with ad hoc emergencies as part of their normal responsibilities. Many of these agencies engage in community awareness and prevention programs to help the public avoid, detect, and report emergencies effectively. The availability of emergency services depends very heavily on location, and may in some cases also rely on the recipient receiving the service.

There are three main emergency service functions: (1) the police, which provide community safety and law enforcement to reduce crime against persons and property; (2) the fire department (fire and rescue services), which provide firefighters to deal with fire and rescue operations as well as some secondary emergency service duties; (3) the emergency medical service (EMS), which provides ambulances and staff to deal with medical emergencies. In some countries these three functions are performed by three separate organizations. However, there are also many countries where fire, rescue and ambulance services are all performed by a single organization.

Emergency services typically have one or more dedicated emergency telephone numbers reserved for critical emergency calls. In some countries, one number is used for all the emergency services. In some countries, each emergency service has its own emergency number. Throughout the United States 911 is used as the telephone number for emergency services.

The goal of most emergency medical services is to either provide treatment to those in need of urgent medical care, with the goal of satisfactorily treating the presented conditions, and arranging for timely removal of the patient to the next point of definitive care. This is most likely an emergency department at a hospital. The term emergency medical service has evolved to reflect a change from a simple system of ambulances providing only transportation, to a system in which actual medical care is given on scene and during transport.

In most places in the world, the EMS is summoned by members of the public (or other emergency services, businesses, or authorities) via an emergency telephone number which puts them in contact with a control facility, which will then dispatch a suitable resource to deal with the situation.

In some jurisdictions, EMS units may handle technical rescue operations such as extrication, water rescue, and search and rescue. Training and qualification levels for members and employees of emergency medical services vary widely throughout the world. In some systems, some members of an EMS team may only qualify to drive the ambulance because they have no medical training. In contrast, most systems have personnel who retain at least basic first aid certifications. Additionally many EMS systems are staffed with advanced life support personnel, including paramedics, or nurses.

Emergency medical services exist to fulfill the basic principles of first aid, which are to preserve life, prevent further injury, and promote recovery. The six stages of high quality pre-hospital care include: (1) Early detection-members of the public, or another agency, find the incident and understand the problem; (2) Early reporting—the first persons on scene make a call to the emergency medical services and provide details to enable a response to be mounted; (3) Early response—the first professional (EMS) rescuers arrive on scene as quickly as possible, enabling care to begin; (4) Good on-scene care—the emergency medical service provides appropriate and timely interventions to treat the patient at the scene of the incident; (5) Care in transit—the emergency medical service load the patient in to suitable transport and continue to provide appropriate medical care throughout the journey; (6) Transfer to definitive care—the patient is handed over to an appropriate care setting, such as the emergency department at a hospital.

A first responder is a person who arrives first at the scene of an emergency, whose job is to respond to the immediate risk to health, life, property, or environment. First responders may be dispatched by the ambulance service, may be passers-by, citizen volunteers, or members of other agencies such as the police, fire department, or search and rescue who have some medical training.

Typically at the beginning of an emergency situation either the person who is injured, in a fire, or a victim to a crime reports the dangerous/emergency incident by calling 911. Once the victim, other individual, or automated system contacts 911, the 911 dispatcher obtains information from the victim including the type of emergency situation, the number of people involved in the emergency situation and the location of the emergency situation. The purpose of acquiring this type of information is for the proper emergency services to be procured as well as to provide information for the emergency responders that arrive on scene. The information provides the first responders with advanced information regarding the emergency and how to correctly respond.

However, the amount of information that can be provided by the individual who calls emergency services is limited to the knowledge of the caller and the know-how of the emergency responders that arrive on scene.

SUMMARY OF THE INVENTION

In view of the foregoing, it is an object of the present invention to provide a method, apparatus, and computer-readable medium for aiding emergency response.

A first exemplary embodiment of the present disclosure provides a method for aiding emergency response. The method includes receiving, by a processor, a plurality of data corresponding to a geographic location from a plurality of data sources and aggregating, by the processor, the plurality of data. This embodiment further includes determining, by the processor, a first profile and a second profile based on the aggregated plurality of data. This embodiment also includes transmitting, by the processor, the first profile to a plurality of user equipments and the second profile to at least one user equipment, wherein the at least one user equipment is different from the plurality of user equipments.

A second exemplary embodiment of the present disclosure provides an apparatus including at least one processor and at least one memory storing computer program instructions, wherein the at least one memory with the computer program instructions is configured with the at least one processor to cause the apparatus to at least receive a plurality of data corresponding to a geographic location from a plurality of data sources. The at least one memory with the computer program instructions is configured with the at least one processor to further cause the apparatus to at least aggregate the plurality of data and determine a first profile and a second profile based on the aggregated plurality of data. The at least one memory with the computer program instructions is configured with the at least one processor to further cause the apparatus to at least transmit the first profile to a plurality of user equipments and the second profile to at least one user equipment, wherein the at least one user equipment is different from the plurality of user equipments.

A third exemplary embodiment of the present disclosure provides a non-transitory computer-readable medium tangibly including computer program instructions, which, when executed by a processor, causes the processor to at least receive a plurality of data corresponding to a geographic location from a plurality of data sources. The computer-readable medium including computer program instructions when executed on the processor further cause the processor to at least aggregate the plurality of data and determine a first profile and a second profile based on the aggregated plurality of data. The computer-readable medium including computer program instructions when executed on the processor further cause the processor to at least transmit the first profile to a plurality of user equipments and the second profile to at least one user equipment, wherein the at least one user equipment is different from the plurality of user equipments.

The following will describe embodiments of the present disclosure, but it should be appreciated that the present disclosure is not limited to the described embodiments and various modifications of the invention are possible without departing from the basic principle. The scope of the present disclosure is therefore to be determined solely by the appended claims.

DETAILED DESCRIPTION OF THE INVENTION

When an emergency occurs, emergency responders either have or are provided a finite amount of information regarding the emergency situation. An emergency situation includes any type of situation that poses an immediate risk to health, life, property, or environment. This information is provided from a number of different sources. First, the individual that calls the 911 dispatcher and reports the emergency typically provides on-site information. Second, known information about the emergency situation such as location information can be relayed from the 911 dispatcher to the emergency responder. Third, the emergency responder may already be aware of information particular to the emergency situation, such as information regarding the neighborhood depending on where the emergency situation is located.

While the information transfer may allow emergency responders to respond to emergencies, there is a need for first responders to be more informed when responding to emergency situations such that they can more appropriately respond. There is also a need to provide a means to better allocate emergency resources for improved emergency response. An emergency resource includes any type of personnel, equipment, or structure that can aid in responding to an emergency situation. Exemplary embodiments of the present disclosure provide a means for gathering and sending enhanced information to first responders or emergency responders about an emergency situation.

Figure 1:
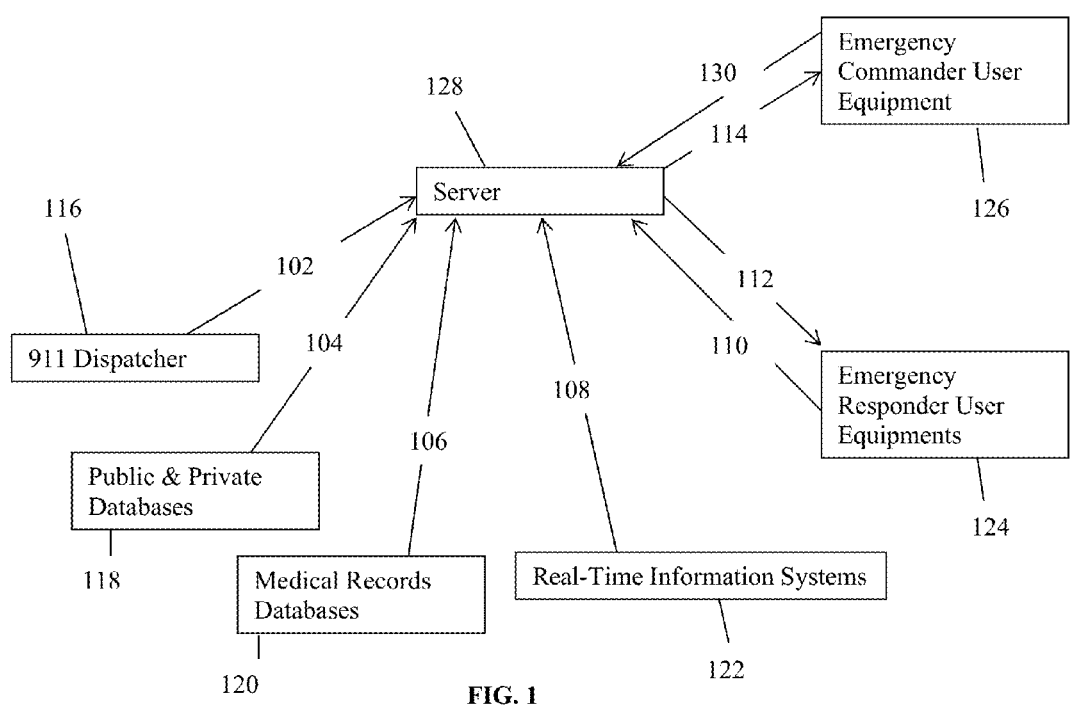
FIG. 1 is a block diagram of the different elements suitable for use in practicing exemplary embodiments of this disclosure.

Referring to FIG. 1, provided is a block diagram of the elements of an exemplary system for performing exemplary embodiments of this disclosure. Shown in FIG. 1 are server 128, a 911 dispatcher 116, public and private databases 118, medical records databases 120, real-time information systems 122, emergency responder user equipments 124, and emergency commander user equipment 126.

Server 128 may contain a processor and a memory that stores computer program instructions which when executed on the processor cause server 128 to perform exemplary embodiments of this disclosure. Server 128 is operably able to communicate with and receive data from 911 dispatcher 116, public and private databases 118, medical records databases 120, real-time information systems 122, emergency responder user equipments 124, and emergency commander user equipments 126. Server 128 may be able to communicate with the other elements 116, 118, 120, 122, 124, and 126 either via a wired or wireless connection. Server 128 may also be able to communicate with the other elements of FIG. 1 over the internet or through a closed network, such as a wireless area network or local area network (LAN). Server 128 may be one server with one processor and one memory or it may include multiple servers that are interconnected to one another with multiple processors and multiple memories.

As shown in FIG. 1, server 128 can receive information or communicate with 911 dispatcher 116. 911 dispatcher 116 provides, communicates, and transmits to server 128 information gathered by a 911 dispatcher. After or during a 911 call the 911 dispatcher can provide the information gathered during the 911 call to server 128 via communication line 102.

Also shown in FIG. 1 is public & private databases 118, which transmits via communication line 104 relevant information to the emergency situation to server 128. Public & private databases 118 include a wide array of information sources. Public & private databases 118 includes historic records maintained by local city, town, and county municipalities; historic records maintained by state and federal governments; records developed by emergency services organizations; and databases compiled by educational institutions. Public & private databases 118 also includes private databases maintained by private companies or organizations that have made their information available to server 128. Public & private databases 118 may also include property tax records; census data including income and demographic data; consumption data, information gathered from airports, shopping malls, hospitals, hotels, restaurants, gas stations, and schools; real estate information; and data from public services and utilities.

Medical Records Databases 120 can transmit via communication line 106 information relevant to the emergency situation to server 128. Medical Records Databases 120 includes any databases that contain or maintain medical records for groups or individuals. Medical Records Databases 120 may include public records available to anyone or it may also include private records maintained by governments, doctors, hospitals, diagnostic centers, or insurance companies. Medical Records Databases 120 also may include medical or personal vital information gathered from personal monitoring devices as well as information regarding medications, allergies, and mental or physical conditions pertaining to the individual or individuals involved in an emergency. Medical Records Databases 120 may include updated medical information gathered by emergency responders at the location of the instant emergency situation.

Real-Time Information Systems 122 can transmit via communication line 108 information relevant to the emergency situation to server 128. Real-Time Information Systems 122 includes any real time information available through public and private services. For example, Real-Time Information Systems 122 may include traffic information gathered from traffic cameras. It may also include information gathered from police, fire department or emergency medical services communication lines. It may also include other systems that can provide live real-time information.

In exemplary embodiments server 128 can aggregate through the vast amounts of information received from 911 Dispatcher 116, Public & Private Databases 118, Medical Records Databases 120, and Real-Time Information Systems 122 and determine two profiles based on the aggregated information. The aggregating in one embodiment includes the use of an algorithm that analyzes all of the received data for indicators of a geographic location and relevance to the emergency. The relevant data is then categorized based on for instance the type of information and then placed into a first profile.

In alternative exemplary embodiments, the information received by server 128 from 911 Dispatcher 116, Public & Private Databases 118, Medical Records Databases 120, and Real-Time Information Systems 122 is routed to for example the nearest server 128 based on the geographic origin of the information. In this embodiment server 128 includes multiple servers with multiple processors and memories that are interconnected and located in different geographic locations. This will provide both redundancy in the network between different servers and the different databases, and the shortest path for the information to connect to server 128.

911 Dispatcher 116, Public & Private Databases 118, Medical Records Databases 120, and Real-Time Information Systems 122 can connect to the closest server 128 based on geographic internet protocol lookup mechanisms and then transfer the data or information to server 128. Once the data is transferred, server 128 may aggregate through the received data by performing subsequent lookups on the data based on its source. For instance, server 128 may receive data from multiple sources such as databases, email, phones, mobile phones, or police scanners. The data will be sent to the closest server 128 and server 128 can aggregate through the data and determine the source and type of data. For example, if the data is an audio stream from a fire department, server 128 will categorize that data and send it to the location of the other audio data collected.

For other types of data, such as email, the from address and the to address can be examined to determine how to categorize and route the data. In other embodiments, emails can be embedded with meta data that indicate the exact source and destination of the email. In other embodiments, each individual server 128 is capable of handling each kind of data or message. Accordingly, based on the results of the lookups, server 128 will internally route the information to a series of secondary servers, which then determine the information that will be included in the first and second profile based on relevancy to the emergency and user selected parameters.

The first profile will be provided to the Emergency Responder User Equipments 124 via communication line 110 and the second profile will be provided to the Emergency Commander User Equipment 126 via communication line 114.

It should be appreciated that in exemplary embodiments of the present disclosure information already present or sent to server 128 can be aggregated prior to receiving notification of an emergency from 911 Dispatcher 116. In this embodiment, server 128 will use the information that has already been aggregated in conjunction with updated information from 911 Dispatcher 116, Public & Private Databases 118, Medical Records Databases 120, and Real-Time Information Systems 122 to create and determine the first profile and the second profile.

Emergency Responder User Equipments 124 can include any type of mobile user equipment that can be used and carried by an emergency responder to send and receive communications from server 128 via communication lines 110 and 112, respectively. An exemplary Emergency Responder User Equipment could be a mobile phone. Emergency Responder User Equipments 124 can receive via communication line 112 multicast messages from server 128 with the first profile containing information relevant to the emergency. Other exemplary embodiments of Emergency Responder User Equipments 124 also include electronic devices or wearables that can be worn by an individual or carried and can both send and receive data, such as two-way radios, smartphones, tablets, wristband devices, ear bud communicators and the like.

Emergency Responder User Equipments 124 are also able to send to server 128 via communication line 110 updated emergency information, such as current location information of the emergency responder and updated emergency information obtained when the emergency responder arrives at the location of the emergency. Since each emergency responder will not always be active or available to respond to emergencies, exemplary embodiments of Emergency Responder User Equipments 124 allow for the user to select whether his/her Emergency Responder User Equipment 124 will share its location information with server 128. Once the Emergency Responder User Equipments 124 transmit their location information it may be routed to the nearest server 128 which in turn updates the first or second profile. The updated emergency information can include medical information of the victim, building or perimeter information regarding the size, make-up and layout of the building or perimeter, or criminal/safety information. The Emergency Responder User Equipments 124 may also send updated information to server 128 with the expertise and skill set information of the particular emergency responder using the user equipment.

The first profile received by Emergency Responder User Equipments 124 in exemplary embodiments contains traffic navigation information from a particular emergency responder's location to the location of the emergency situation. The first profile may depict a map and will be able to provide the best possible route from the emergency responder's location to the location of the emergency as server 128 has taken into account other emergencies, road conditions and detours. It should be noted that the first profile may vary between different Emergency Responder User Equipments as it is assumed that each emergency responder is at least in a different physical location and has different skill sets or expertise.

The first profile may also differ or vary between different Emergency Responder User Equipments 124 as each profile received by the Emergency Responder User Equipments 124 can be customized by the Emergency Commander User Equipment 126, which can transmit and receive specialized information sent to one or a group of particular Emergency Responder User Equipments 124. The Emergency Commander User Equipment 126 can update the first profile such that it includes emergency intelligence or directions as how to properly respond to a specific emergency. This is an exemplary embodiment of user specific information. User specific information includes any type of information that is or would be relevant only for specific emergency responders and would not be applicable to emergency responders generally.

The first profile also may contain medical information about the individual or individuals involved in the emergency. Based on the particular type of emergency entered by the 911 Dispatcher 116, server 128 will provide to Emergency Responder User Equipments 124 through the first profile, pertinent medical information about the individual or individuals involved in the emergency. For example, the 911 Dispatcher 116 may provide information to server 128 that an individual is having a heart attack. Medical Records Databases 120 may provide among other things information to server 128 indicating that this individual suffers from an allergy to aspirin. This information could be included in the first profile provided to Emergency Responder User Equipments 124 such that when the emergency responders arrive at the scene of the emergency they already know not to administer aspirin to the victim.

In other exemplary embodiments, the first profile may contain medical information indicating that the individual or individuals involved in the emergency have special needs. For example, the first profile may contain medical information indicating that one or more of the individuals involved in the emergency situation is handicapped or requires a wheelchair, or is on oxygen. This type of information will enable emergency responders to be more prepared when they arrive at the scene of the emergency as they may be able to plan and bring the proper special needs equipment.

In other exemplary embodiments, the first profile may also include biometric information of the individual or individuals involved in the emergency situation. The biometric information will allow in some instances for the emergency responders to verify the identity of the individual or individuals involved in the emergency situation. The biometric information in some exemplary embodiments allow for the individual or individuals involved in the emergency situation to verify the biometric information and provide a release of their medical records to the emergency responders for a specified period of time. Exemplary embodiments of biometric information include fingerprint scans, retinal scans, photographs and the like. In other exemplary embodiments, the specified period of time that the medical records are released to the emergency responders can be customized or adjusted by the emergency commander or from inputs by the Emergency Commander User Equipment 126.

The first profile may also include predictive information about the emergency. For instance, based on the aggregated information in server 128, the predictive information may include the likelihood in terms of a percentage of the cause of the emergency, a likely best possible response to the emergency or the likelihood of certain elements at the location of the emergency, such as the possibility of a defibrillator or a firearm. The predictive information in some exemplary embodiments may provide the likelihood of an occurrence that could endanger the emergency responders based on the time of the day, the day of the week, or time of the year. The predictive information may also include in other exemplary embodiments historical events, such as games, parades, or weather patterns that may typically occur. For instance, the first profile may include information regarding an unsanctioned, unapproved, or unscheduled parade or march that typically occurs on the date in question that is near the location of an emergency situation. Since the parade or march is not scheduled, the first profile would provide an estimated guess that it would occur.

The first profile may also include perimeter intelligence information about the location of the emergency. Perimeter intelligence information will include any type of information that may prove useful about the location of the emergency to the emergency responders. For instance, if the emergency is a fire in a building, the perimeter intelligence may provide information about nearby buildings, such as whether it contains hazardous or flammable chemicals. The perimeter intelligence may also provide the number of bedrooms that are in a particular building or house, the location of the bedrooms, and which bedrooms are occupied. This type of information will provide essential to the fire fighters on the scene such that they can appropriately respond to the fire and prevent an emergency from escalating.

The perimeter intelligence may also include information about the make-up of the building where the emergency is located, or information pertaining to events or individuals of interest in the area of the emergency situation that may affect the ability of emergency responders to properly respond to the emergency. The perimeter intelligence may include information about individuals of interest in the area of the emergency location, such as criminals known to be in the area. If the location of the emergency is in an area with high rates of crime then this information may be included in the perimeter intelligence.

In other exemplary embodiments, the perimeter intelligence includes access to photographs or videos detailing the location of the emergency. This can provide information regarding the layout of the emergency location or the current state of the location. For instance, the emergency location may be in an abandoned building and the photographs or video may show emergency responders the state of decay. Alternatively, the photographs or videos could be from other emergency responders that are already at the scene of the emergency situation in order to provide updates to the emergency commander or other emergency responders that have not yet arrived at the scene of the emergency.

Exemplary embodiments of the first profile include displaying multiple emergencies and emergency locations. In the case that multiple emergencies are displayed in the first profile, each emergency may be signified differently in the first profile order to notify the emergency responders the importance or urgency of a particular emergency. For example, if an emergency involving a river or water hazard appears in the first profile and a particular emergency responder is a rescue diver, that particular emergency may be prioritized for that emergency responder in the first profile through the use of a different color, symbol, indicator, or the like. This is an exemplary embodiment of a user specific information.

Exemplary embodiments of the first profile also provide that different emergencies may appear differently for different emergency responders due to the particular skill set of the emergency responder. For instance, an emergency responder with specialized skills in cardiac emergencies may have emergencies dealing with cardiac arrest prioritized by having that particular emergency appear in a different color, symbol or indicator than for other types of emergencies in their first profile. Exemplary embodiments of the first profile provide that different emergencies and resources may appear in differing colors or symbols indicating a level of importance or urgency. The appearance of a particular emergency may also be displayed or shown indicating the age of the emergency. A recent emergency may appear in a different color or symbol than an emergency that was reported hours or minutes earlier. This is an exemplary embodiment of a user specific information.

Additionally, each emergency detailed in the first profile may also include a risk assessment of the emergency. This will indicate volatility of the situation and a level of danger to emergency responders. The risk assessment will provide information regarding whether it is safe for emergency responders to enter the location where the emergency is located. The risk assessment may also provide warnings to emergency responders as to known or predicted pitfalls that might await them at the emergency location.

In another exemplary embodiment, the first profile can be configured or customized by the Emergency Commander User Equipment 126 such that particular Emergency Responder User Equipments 124 can have the ability to communicate to one another. For example, five different emergency responders may respond to a single emergency situation. All five emergency responders may not be arriving together or at the same time. Accordingly, the Emergency Commander User Equipment 126 could customize the first profile received by these five Emergency Responder User Equipments 124 such that the emergency responders using these Emergency Responder User Equipments 124 can communicate with one another in order to coordinate their response efforts or to update other emergency responders as to the situation. This is an exemplary embodiment of user specific information.

As 911 dispatcher 116 receives more calls for emergencies, server 128 will continuously update the first profile with new emergencies. Based on the skill set or expertise of a particular emergency responder, server 128 will tailor the first profile such that emergencies that are more suited for a particular emergency responder are prioritized, highlighted or displayed in a different color. Server 128 will also tailor the first profile such that emergency responders that lack certain qualifications required to appropriately respond to a given emergency are not notified in their first profile of that particular emergency.

Emergency Commander User Equipment 126 is able to receive and send data to server 128 via communication lines 114 and 130, respectively. Emergency Commander User Equipment 126 operably receives via communication line 114 the second profile from server 128. Emergency Commander User Equipment 126 is also able to send via communication line 130 updated information to server 128. Some exemplary embodiments of updated information include information sent to the Emergency Responder User Equipments 124, such as indicators directing certain emergency responders to respond to an emergency or additional real-time information or know-how from the emergency commander.

Exemplary embodiments of an Emergency Commander User Equipment 126 include a mobile user equipment such as a mobile phone, personal computer or the combination of numerous displays, processors, computer-readable memories, and keyboards/touch displays. Exemplary embodiments of an Emergency Commander User Equipment 126 also include command centers and mobile command centers that provide for support, communication with and allocation of resources for emergency responders.

The second profile in exemplary embodiments may contain location information for numerous emergency responders and numerous emergencies. Exemplary embodiments of the second profile allow the emergency commander to selectively choose an emergency responder or a particular emergency and the second profile may then display information particular to that emergency or emergency responder.

Exemplary embodiments of the second profile contain traffic navigation information from a particular emergency responder's location to the location of the emergency situation. The first profile may depict a map and will be able to provide the best possible route from the emergency responder's location to the location of the emergency as server 128 has taken into account other emergencies, road conditions, and detours. The second profile also may contain the location information of multiple emergency responder user equipments such that the Emergency Commander User Equipment may direct, interact, and communicate with a particular emergency responder.

The second profile may also selectively contain medical information about the individual or individuals involved in the emergency. Based on the particular type of emergency entered by the 911 Dispatcher 116, server 128 will provide to the Emergency Commander User Equipment 126 through the second profile, pertinent medical information about the individual or individuals involved in the emergency. The emergency commander in exemplary embodiments will be able to selectively choose which medical information is provided based on the particular emergency that is selected by the emergency commander.

The second profile may also include predictive information about the emergency. Again, the second profile can display, based on the particular emergency that is selected, predictive information particular to that emergency. For instance, based on the aggregated information in server 128, the predictive information may include the likelihood in terms of a percentage of the cause of the emergency, a likely best possible response to the emergency or the likelihood of certain elements at the location of the emergency, such as the possibility of a defibrillator or a firearm.

The second profile may include perimeter intelligence information about the location of the emergency. Based on the particular emergency selected by the emergency commander, the second profile may provide perimeter intelligence information specific to the selected emergency. The Perimeter intelligence will include any type of information that may prove useful about the location of the emergency. The perimeter intelligence may also include information about the building where the emergency is located as well as information about individuals known to be in the area. For example, the perimeter intelligence may include information about the construction of the building where the emergency is located and the types of materials used in constructing the building. Alternatively, the perimeter intelligence may include information regarding nearby resources such as fire hydrants. If the location of the emergency is in an area with high rates of crime then this information may be included in the perimeter intelligence.

The second profile may further include geofencing around a given emergency location. A geofence defines a virtual area surrounding a location indicating an area of an emergency or resource. In other exemplary embodiments, a geofence can also define an area surrounding a location of an emergency responder or an electronic device that is worn, carried, or operated by an emergency responder, an individual, or emergency commander. The geofence can also accurately record and monitor attendance to an emergency call. As the location of a given emergency responder coincides with the perimeter of the geofence, the emergency responder will be marked as having responded to the emergency situation. In other words, the second profile shows the location information of an emergency responder and tracks when an emergency responder actually responds to an emergency by recording when the emergency responder enters the geofenced area.

In exemplary embodiments, a geofence is created around an item, such as Emergency Responder User Equipments 124, a resource, an emergency location, or the like. The locations of the Emergency Responder User Equipments 124 are typically tracked and determined using a global positioning system (GPS). Exemplary embodiments of the Emergency Responder User Equipments 124 include the capability to communicate and transmit data such that they can relay information with GPS networks to determine their location. Once the Emergency Responder User Equipments 124 determine their individual global position, they continuously or periodically transmit their position to server 128, which in turn updates the second profile. Resources and emergency locations typically are not equipped with GPS tracking capabilities. Accordingly, exemplary embodiments of this disclosure may rely on current address and mapping data such that GPS networks can determine the global position of a resource or emergency location.

In other exemplary embodiments GPS enabled devices, such as mobile phones, smartphones, or wearables, can periodically transmit their position to a server 128 after a given time or after a certain distance is travelled. The server 128 will compare the location information provided by the device to the location of stationary objects nearby. If the location is within a pre-defined threshold, the server 128 determines that a user is at a particular location.

Once the position of Emergency Responder User Equipments 124, resources, or emergency locations are determined, Server 128 creates a user defined virtual geographic perimeter encompassing the geographic location of the Emergency Responder User Equipments 124, resources, or emergency location. The virtual geographic perimeter in exemplary embodiments is a uniform user defined distance from the Emergency Responder User Equipments 124, resource, or emergency location. In other embodiments, the virtual geographic perimeter is not a uniform distance from the Emergency Responder User Equipments 124, resources, or emergency location and can be any shape or size.

The global position of the Emergency Responder User Equipments 124 is tracked using GPS networks such that it can be recorded by the Emergency Responder User Equipments 124 or server 128 when the Emergency Responder User Equipments 124 global position changes from being outside the virtual geographic perimeter to inside the virtual geographic perimeter (enters) or changes from being inside the virtual geographic perimeter to outside the virtual geographic perimeter (exits). Other exemplary embodiments also include other methods of tracking the geographic location of Emergency Responder User Equipments 124, resources, or emergency locations, such as through mobile phone networks, wireless internet networks, or private networks.

For non-GPS enable devices, the device can be equipped with a low power, or passive transmitter. The difference between a passive transmitter and active transmitter is that an active transmitter requires its own power source whereas a passive transmitter relies on an external device. An example of a passive transmitter would include an anti-theft device found in retail stores that is attached to clothing or other items for sale, which activates alarms when it passes through detectors located at the exits of the retail store.

Exemplary embodiments of geofencing include the use of active receivers at an emergency location. It can be determined whether a given transmitter or device is within range of the emergency location by determining whether the device receives a signal from the active receivers. If a signal is received, the device is within range and thus within the geofence. If no signal is received, the device is assumed to be outside of the range and outside of the geofence. This particular embodiment may be ideally used for instances where the location in question is not fixed.

Exemplary embodiments of geofencing also include the placement of small receivers around a location, or at key entry and exit points. In one embodiment, the receivers can be configured in pairs to determine the direction of travel of an active transmitter device. In this configuration, the location information received by the receivers is compared to one another other such that it is possible to determine for example a device's approximate location, or if the device is in a building or has left the building. If a device has been removed from the building, further exemplary embodiments including comparing receiver data with video camera data or badge swipe device technology such that it can be determined which party is responsible for the removing the device. Additional exemplary embodiments include the use of receivers and transmitters to determine a specific location of a device using radio-frequency triangulation technics. In other exemplary embodiments, a virtual geographic perimeter can be created around the location of an emergency. For instance, if the emergency call was made by a GPS enabled device the location of the calling device can be determined using GPS networks or by determining the position of the emergency based on the nearest address provided by the caller. Server 128, having received the location information for Emergency Responder User Equipments 124, may indicate in the first profile or through an audio or visual alert on the Emergency Responder User Equipments 124 notifying all of the emergency responders within the virtual geographic perimeter of the emergency.

Figure 2:
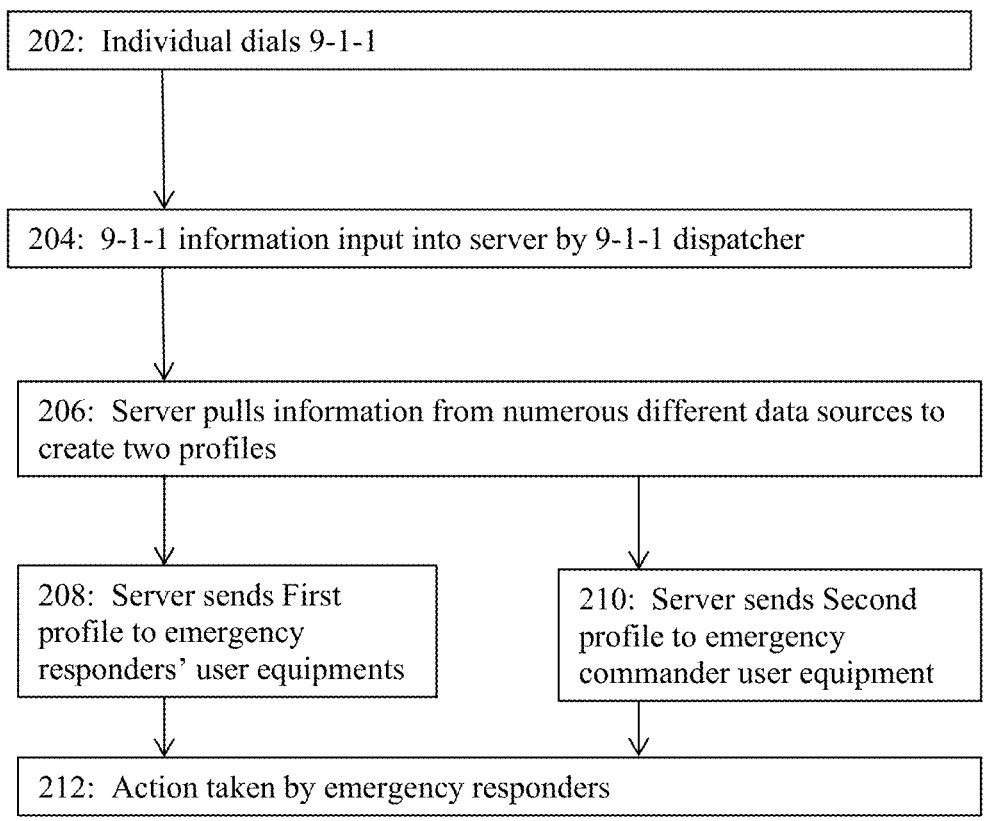
FIG. 2 is a flowchart illustrating an exemplary embodiment of the steps for enhanced emergency response.

Referring to FIG. 2, presented is a flowchart illustrating an exemplary embodiment of the steps for enhanced emergency response. At block 202 an individual or automated system contacts 911 and answers the typical questions asked by the 911 dispatcher, such as the particular type of emergency situation, the location of the emergency, and the people involved in the emergency situation. If it is an automated system then the only information provided will be that information which the automated system is programmed to provide, such as location information and the cause of the alarm. Then at block 204 the 911 dispatcher in addition to notifying the proper emergency responders enters the information gathered from the 911 call info a server. This entering of information can be done by the 911 dispatcher as a separate entry from the system where it is normally entered or it can be done simultaneously. For example, the information gathered from the 911 call may be entered into the server by a voice recognition software that enters the information during the telephone call or it can electronically pull the information directly from the systems that maintain the records of the 911 dispatcher.

Then at block 206, the server pulls information from numerous different data sources to create two profiles. Some exemplary embodiments of different data sources include public records, private records, medical records, and real-time information. The flowchart continues at block 208 where the first profile is sent to emergency responders' user equipments. Then at block 210 the server sends the second profile to the emergency commander user equipment. At block 212 the appropriate action is taken by the emergency responders to respond appropriately to the emergency situation based on the information from the first profile and the second profile. It should be appreciated that FIG. 2 merely provides one exemplary flowchart of the process of exemplary emergency response. In other exemplary embodiments the first profile sent to emergency responders' user equipments at block 208 can be customized by the emergency commander user equipment, which can send updated information or specific instructions to the server. The server then incorporates the customizations from the emergency commander and sends the first profile to the emergency responders' user equipments at block 208.

Figure 3:
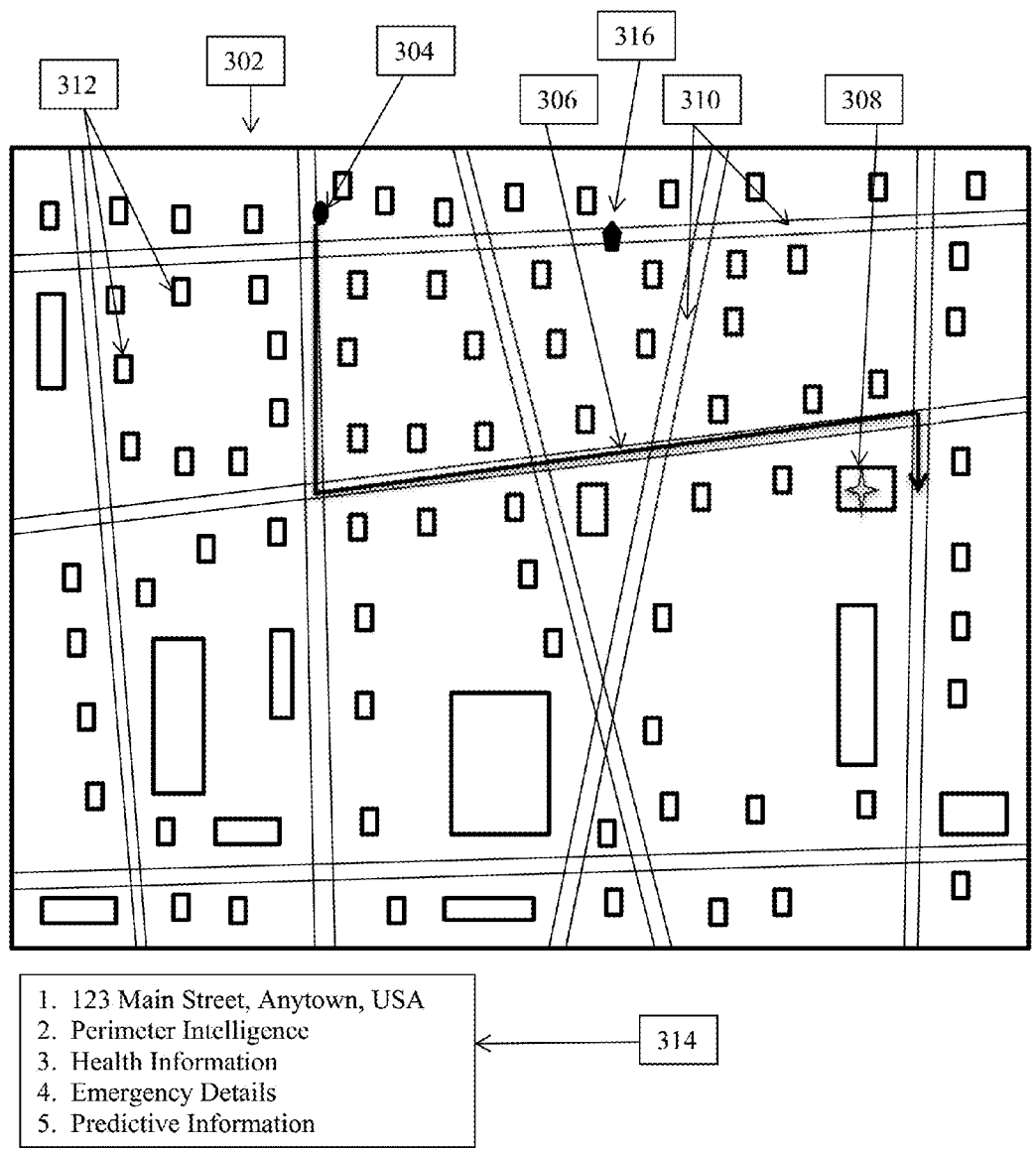
FIG. 3 is an exemplary profile suitable for use with exemplary embodiments of this disclosure.

Referring to FIG. 3, provided is an exemplary embodiment of a profile suitable for use with exemplary embodiments of this disclosure. The profile 302 depicted in FIG. 3 is an exemplary embodiment of a profile that may be sent to the user equipments of emergency responders. As can be seen in FIG. 3, provided is a map containing buildings 312 and streets 310. Shown in profile 302 is the current location of one particular emergency responder user equipment 304. The line 306 indicates the best route to the emergency, which is signified by star 308. Profile 302 also includes at block 314 address information, perimeter intelligence, health information, emergency information, and predictive information about the location of the emergency and the individuals involved in the emergency.

It should be appreciated that even though in the embodiment shown in FIG. 3 there is only one emergency 308, exemplary embodiments of profile 302 may include multiple emergency locations. Also shown in FIG. 3 is road hazard 316, which may signify a road block or other type of condition that would prevent the emergency responder from choosing that route to the emergency 308.

Figure 4:
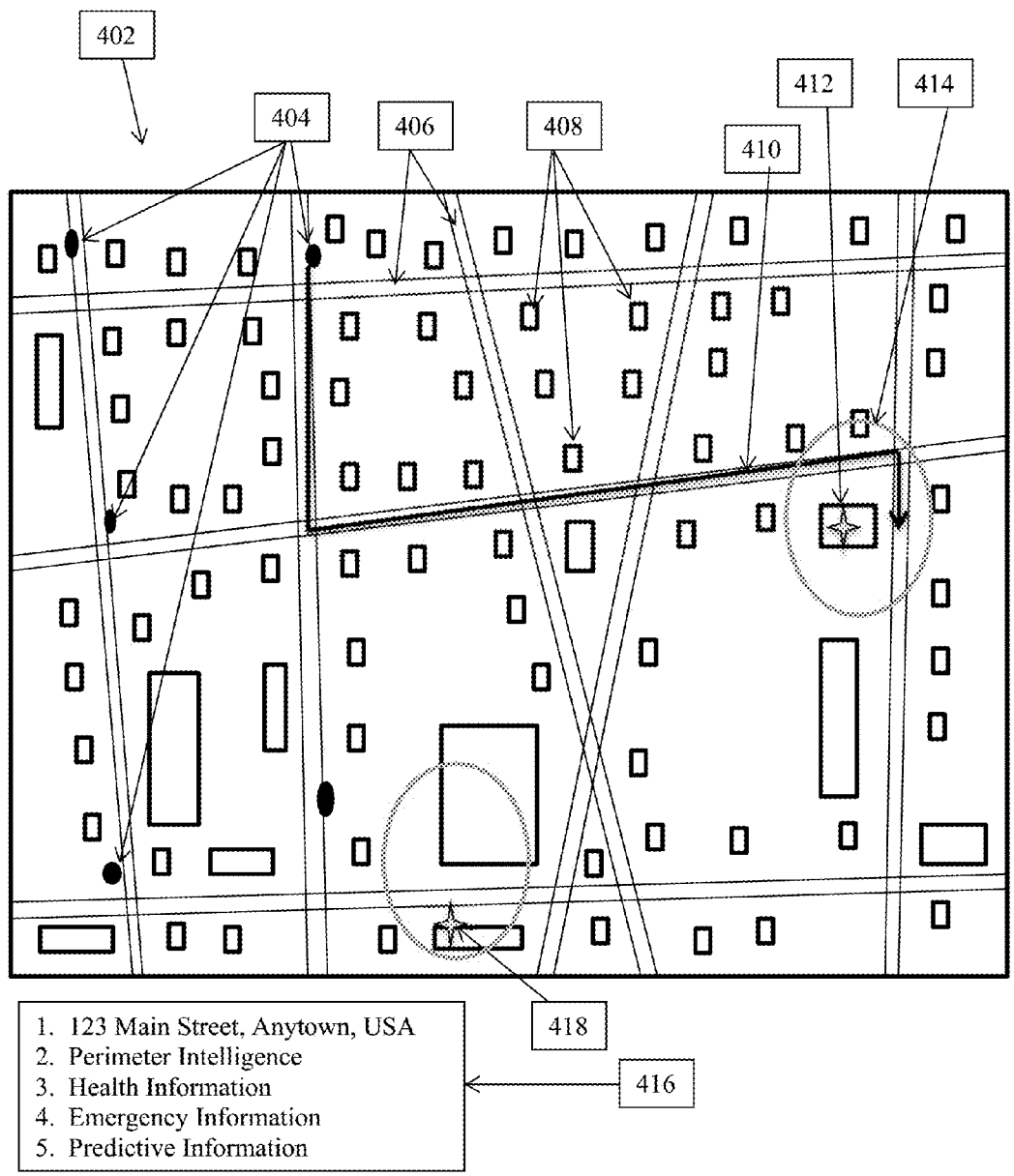
FIG. 4 is another exemplary profile suitable for use with exemplary embodiments of this disclosure.

Referring to FIG. 4, provided is an exemplary embodiment of a second profile 402 suitable for use with exemplary embodiments of this disclosure. As can be seen in FIG. 4, the second profile 402 includes a map layout with buildings 408 and streets 406. Also shown in profile 402 are locations of multiple emergency responders 404. When a particular emergency responder 404 is selected, the best route 410 to the emergency 412 is displayed. Circle 414 represents a geofence surrounding the emergency 412 for tracking when an emergency responder 404 enters the emergency situation.

Block 416 of profile 402 displays the address of the emergency, perimeter intelligence, health information, emergency information, and predictive information for the particular emergency selected. If a different emergency is selected, such as emergency 418, a different set of information is displayed at block 416 with information that is particular to emergency 418.

Figure 5:
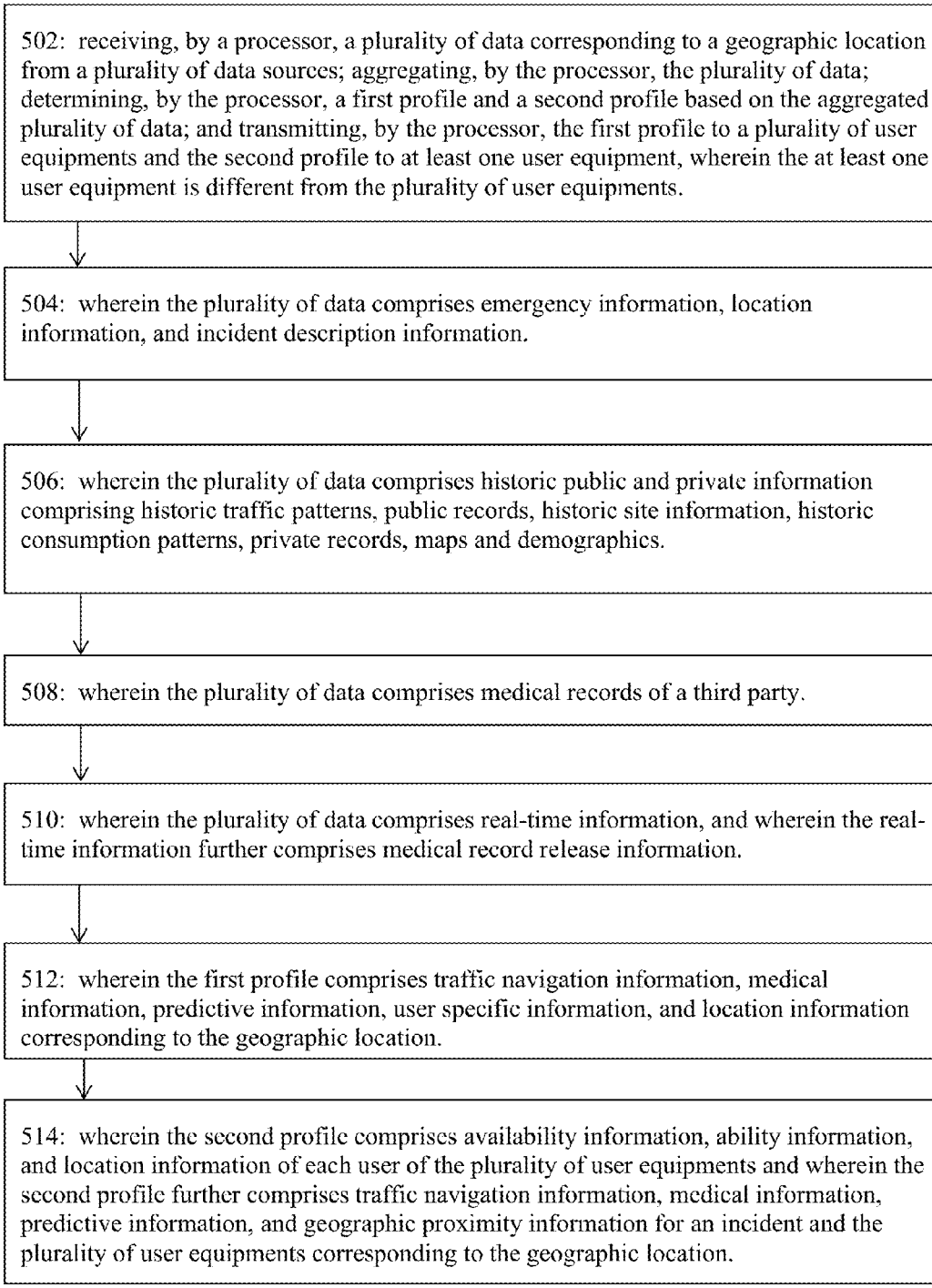
FIG. 5 is a logic flow diagram in accordance with a method, apparatus, and computer-readable medium for performing exemplary embodiments of this disclosure.

FIG. 5 presents a summary of the above teachings for enhanced emergency response. Block 502 presents receiving, by a processor, a plurality of data corresponding to a geographic location from a plurality of data sources; aggregating, by the processor, the plurality of data; determining, by the processor, a first profile and a second profile based on the aggregated plurality of data; and transmitting, by the processor, the first profile to a plurality of user equipments and the second profile to at least one user equipment, wherein the at least one user equipment is different from the plurality of user equipments. Then block 504 specifies further wherein the plurality of data comprises emergency information, location information, and incident description information.

Some of the non-limiting implementations detailed above are also summarized at FIG. 5 following block 504. Block 506 relates to wherein the plurality of data comprises historic public and private information comprising historic traffic patterns, public records, historic site information, historic consumption patterns, private records, maps and demographics. Block 508 specifies wherein the plurality of data comprises medical records of a third party. Block 510 further specifies wherein the plurality of data comprises real-time information, and wherein the real-time information further comprises medical record release information.

Then proceeding to block 512, which specifies wherein the first profile comprises traffic navigation information, medical information, predictive information, user specific information, and location information corresponding to the geographic location. Finally at block 514 it is stated that wherein the second profile comprises availability information, ability information, and location information of each user of the plurality of user equipments and wherein the second profile further comprises traffic navigation information, medical information, predictive information, and geographic proximity information for an incident and the plurality of user equipments corresponding to the geographic location.

Thus, the present system pulls information from numerous resources and databases to create two profiles with pertinent and applicable information that is sent to user equipments.

The logic diagram of FIG. 5 may be considered to illustrate the operation of a method, and a result of execution of computer program instructions stored in a computer-readable memory, and a specific manner in which components of an electronic device are configured to cause that electronic device to operate, whether such an electronic device is a server, computer, user equipment or some other device, or one or more components thereof. The various blocks shown in FIG. 5 may also be considered as a plurality of coupled logic circuit elements constructed to carry out the associated function(s), or specific result of strings of computer program instructions or code stored in a memory.

Various embodiments of the computer-readable medium or computer-readable memory include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. Various embodiments of the processor include but are not limited to general purpose computers, special purpose computers, microprocessors, digital signal processors and multi-core processors.

Figure 6:
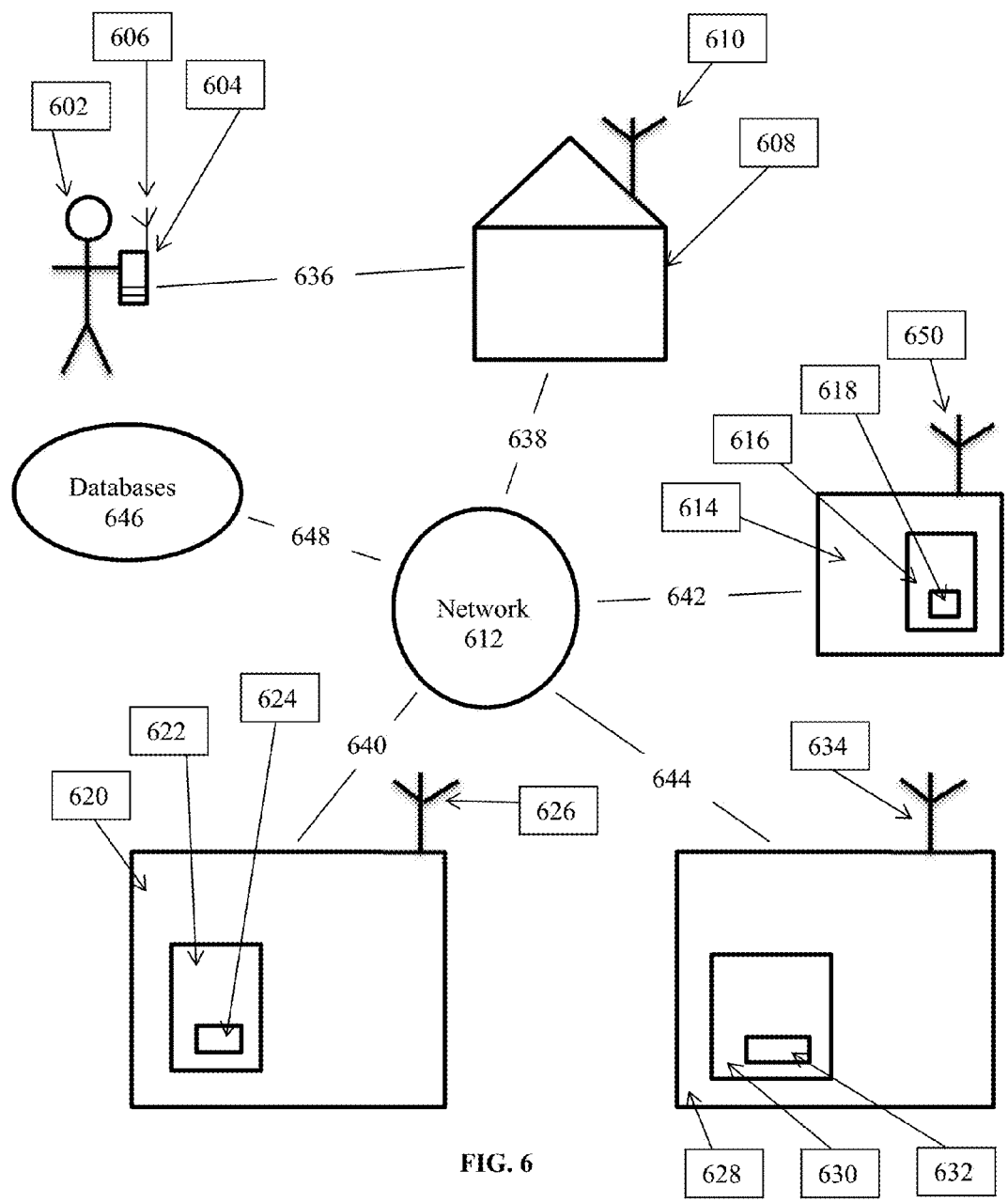
FIG. 6 is a diagram of devices suitable for practicing exemplary embodiments of this disclosure.

Referring to FIG. 6, shown is diagram of devices suitable for practicing exemplary embodiments of this disclosure. FIG. 6 illustrates an individual 602 with electronic device 604 having a transmitter/receiver 606. Electronic device 604 can be any mobile user equipment suitable for calling or notifying emergency services that there is an emergency. Some exemplary embodiments of electronic device 604 include mobile phones, two way radios or direct signaling devices to third party emergency services.

Electronic device 604 in exemplary embodiments is able to communicate via communication line 636 with emergency services or 911 dispatcher 608. Emergency services or 911 dispatcher 608 in exemplary embodiments includes an transmitter/receiver 610 and a means for communicating with and inputting emergency information into network 612 via communication line 638. Exemplary embodiments of means for communicating with and inputting emergency information into a network include computers, processors, and memories.

Exemplary embodiments of network 612 include the internet, cellular networks, public networks, private networks, local area networks, and wireless area networks. Network 612 provides a conduit for communication between the different elements described in FIG. 6.

Also shown in FIG. 6 is server 620 including processor 622 and memory 624 containing computer program instructions, which when executed on processor 622 can cause processor 622 to perform exemplary embodiments of this disclosure. Server 620 also includes transmitter/receiver 626 and is able to communicate with network 612 via communication line 640.

FIG. 6 also illustrates an emergency responder user equipment 628 including processor 630 and memory 632 containing computer program instructions, which when executed on processor 630 can cause processor 630 to perform exemplary embodiments of this disclosure. Emergency responder user equipment 628 also includes transmitter/receiver 634 and is able to communicate with network 612 via communication line 644.

FIG. 6 further depicts emergency commander user equipment 614 including processor 616 and memory 618 containing computer program instructions, which when executed on processor 616 can cause processor 616 to perform exemplary embodiments of this disclosure. Emergency commander user equipment 614 also includes transmitter/receiver 650 for communicating with network 612 via communication line 642.

Network 612 is also able to communicate with databases 646 via communication line 648. Exemplary embodiments of databases 646 include public databases, public databases, medical databases, emergency information databases, criminal statistic databases, and real-time systems. It can be appreciated that exemplary embodiments of communication lines 638, 640, 642, 644, and 648 include any type of communication network available, such as cellular networks, radio network, private networks, public networks, telephone networks, and the like.

Exemplary embodiments of the present disclosure provide a system as shown in FIG. 1 and FIG. 6 for taking vast amounts of information and creating and transmitting profiles to aid in enhanced emergency response. The transmitting and receiving of information or data between the different elements of these exemplary systems can be through a message-passing interface that leverages conventional message-passing constructs while adding additional functionality to reduce latency and improve security. This messaging is further described below.

Computers typically communicate with each other over an internet-protocol (IP) connection. With an IP connection, computers are each assigned a unique IP address. IP addresses are described in the form of aaa.bbb.ccc.ddd, where each three digit segment is a number in the range of 000 to 255. However, since IP addresses are difficult to remember, each IP address has been mapped to a specific Domain Name.

Load balancing is the method of distributing the workload of a network among a number of computers to reduce the workload on an individual computer. There are two primary methods of load balancing that can be used to improve overall performance of a system. The first method is known as round-robin Domain Name System (DNS) and the second is load-balancing proxy.

Round-robin DNS operates such that multiple IP addresses are registered for a domain name. For instance, yahoo.com has three IP addresses registered, 98.139.183.24, 206.190.36.45, and 98.138.253.109. When a computer tries to connect to yahoo.com, it will pick one of those three IP addresses and attempt to connect to it. If the selected IP address is unavailable, a retry mechanism will attempt another IP address after a certain amount of time.

Figure 7:
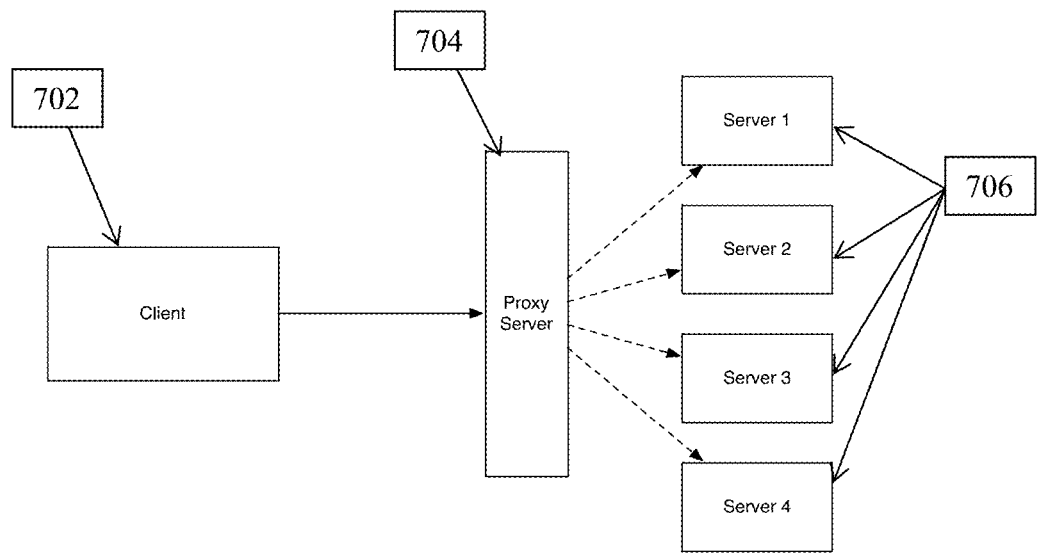
FIG. 7 is a block diagram depicting the operation of a load-balancing proxy server in accordance with exemplary embodiments of this disclosure.

FIG. 7 depicts the operation of a load-balancing proxy server. In this instance, the client 702 does not transmit directly to servers 706. Rather, client 702 connects to proxy server (the load-balancer) 704 and the proxy server 704 passes the work off to other servers 706.

Round-robin DNS and load-balancing proxy can be used in combination where there are multiple proxy-servers all registered for the same domain name. The proxy-servers are load balanced by the client via DNS, and the proxy-server distributes the work. This method is utilized mostly by large websites such as google.com and amazon.com.

While the combination of round-robin DNS and load-balancing proxy works reasonably well for conventional Internet traffic (e.g., web and email traffic), it is not well suited for applications where end-to-end latency, security, and reliability are primary concerns. There are three main reasons that this combination may not be well suited.

First, in a round-robin system, when a client attempts to reach a certain IP address a time-out mechanism is used such that the client knows when to retry on another server when no response is received from the IP address. This retry mechanism is fairly long as to ensure a server is really unavailable, thus avoiding duplicate messages from being delivered to multiple servers. This retry mechanism thus increases the latency in a system at least by the time period that must be waited before attempting another server.

Second, in the round-robin system, the server cannot indicate to the client whether it is available or busy. Therefore, the client attempts to connect with the servers by simply alternating between all the servers in the list without regard to the loading on a particular system. Accordingly, the client can waste time attempting to connect to a server that is not available.

Third, the client must establish a secure connection to each server on every connection. The security mechanism requires multiple exchanges of information to establish both encryption (message security) and authenticity (to verify that both the client and server are who they claim). Again, this security mechanism simply adds additional time that is required to connect to a server and thus affecting the latency in the system.

A reverse proxy can overcome some of these issues associated with the combination of round-robin DNS and load-balancing proxy because it can communicate with backend servers to determine the load of each server and only send requests to the servers that have sufficiently available resources. Yet, a major issue with a reverse proxy server is that it is a single point-of-failure. That is, if the reverse proxy server fails for any reason, the entire system is unavailable.

Thus, the proxy server does not overcome the issue of long retry times or latency incurred when establishing a secure connection.

Exemplary embodiments of the present disclosure where the set of servers is relatively static provide a mechanism that can be employed to reduce latency, improve reliably and load balance effectively. In this exemplary system, there exists one or more registration services to which clients and servers connect to upon instantiation. When a server comes online, it sends a message to the registration services indicating its connection information, including its IP address. The registration servers then forward this information to each client so the clients know to which servers they should connect.

Figure 8:
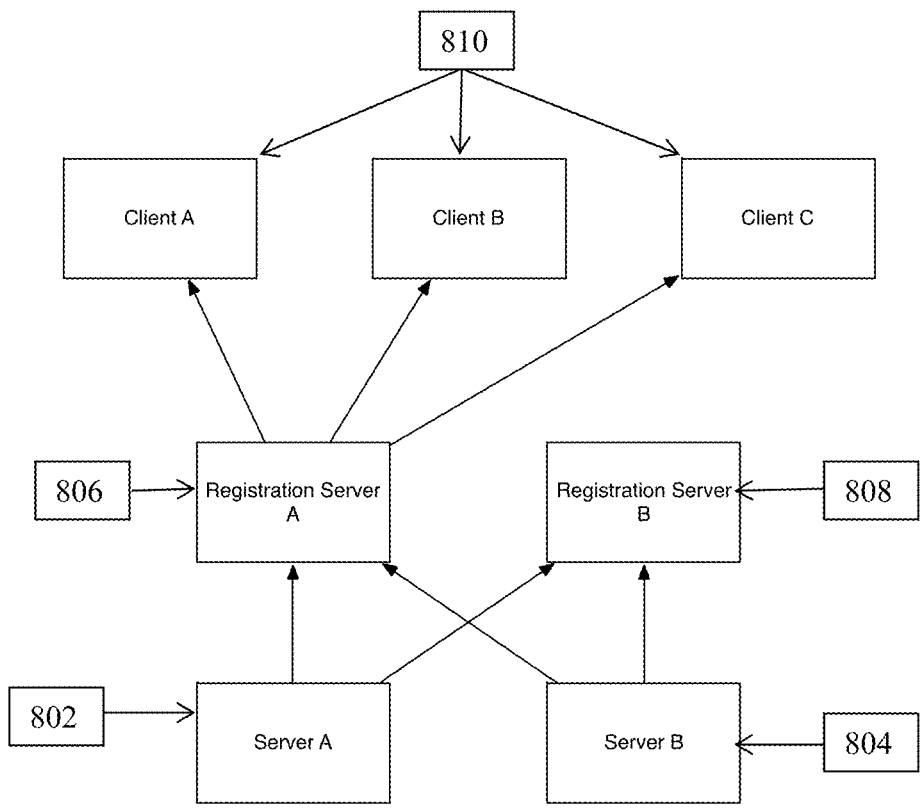
FIG. 8 is a block diagram illustrating an exemplary messaging system in accordance with exemplary embodiments of this disclosure.

FIG. 8. illustrates an exemplary system for this type of messaging. Shown in FIG. 8 are servers 802 and 804. When servers 802 and 804 connect to the network, such as a LAN, wireless area network or the internet, they send a message to each registration server 808 and 806 indicating their connection information. The registration servers 806 and 808 then forward this connection information to the clients 810.

Each client 810 keeps track of a list of all available servers 802 and 804 and employs a round-robin mechanism to distribute the workload among the servers 802 and 804. Two key differences make this system more robust than prior arrangements. First, connections between the clients 810 and the servers 802 and 804 are static. That is, once a client 810 or servers 802 or 804 comes online, a connection from each client 810 is established to every server 802 and 804. Pre-placed encryption keys are utilized between the servers 802 and 804 and clients 810 to minimize the amount of time that is required to establish the connection. Additionally, pre-placed keys offer a solid form of authentication between the servers 802 and 804 and clients 810.

In order to further reduce latency and eliminate the possibility of duplicate messages between clients and servers, each message utilizes a time-to-live (TTL). The TTL provides a time by which the server MUST respond to the message. Each TTL is generated by the client and sent as part of its messages. It should be noted that in order for the TTL to work as intended, all clients and servers must have synchronized clocks. This can be achieved by utilizing a Network Time Protocol (NTP) throughout the system.

Figure 9:
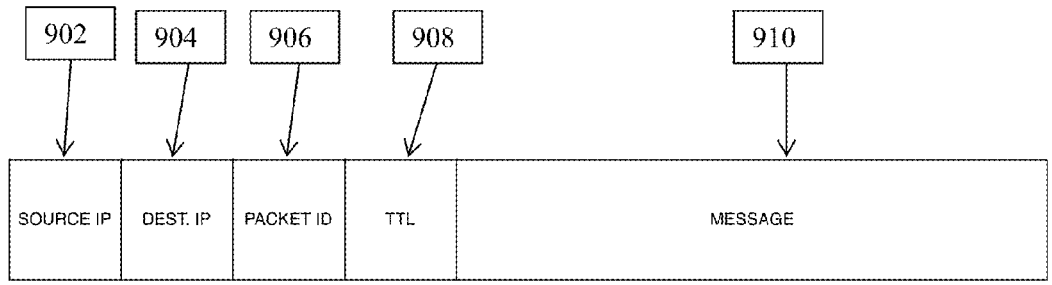
FIG. 9 is a messaging diagram in accordance with practicing exemplary embodiments of this disclosure.

FIG. 9 depicts an exemplary message format utilized for this messaging interface. As shown in FIG. 9 an exemplary message includes a source IP address 902 indicating the IP address of the entity that originated the message, a destination IP address 904 indicating the IP address of the intended recipient of the message, a packet ID 906 indicating an identifier of the packet, a TTL 908, and the message 910 itself. When responding to the message shown in FIG. 9, the server or client can either 'acknowledge' (ACK) or 'not-acknowledged' (NAK). In the case of an ACK, the server is not obligated to provide the results of its processing, but if it cannot provide a result, it must ACK the response with another time indicating a time by which the server will respond with the meaningful response.

Figure 10:
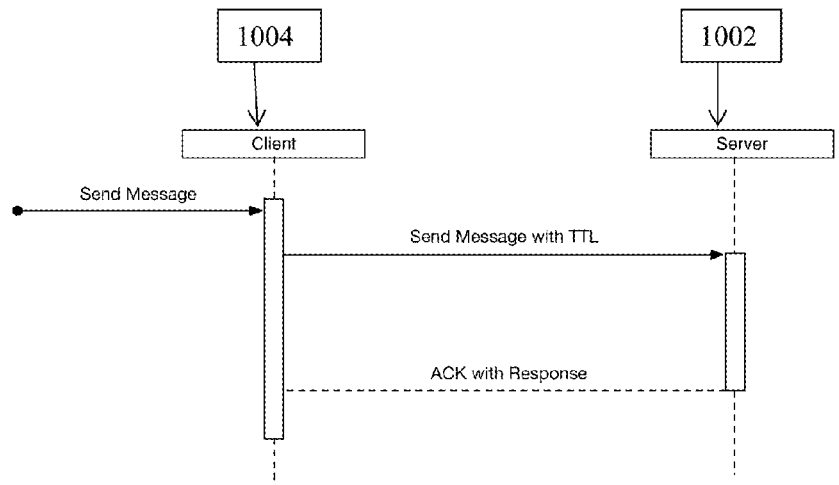
FIG. 10 is a signal diagram in accordance with practicing exemplary embodiments of this disclosure.

FIG. 10 shows the most common case, where the server 1002 immediately sends an ACK to the request from the client 1004 with the response. In order for this to occur, the server must be able to perform whatever required calculations are needed before the TTL expires. As shown in FIG. 10, the client 1004 is directed to send a message with a TTL to server 1002. Server 1004 then sends an ACK with a response to client 1004.

Figure 11:
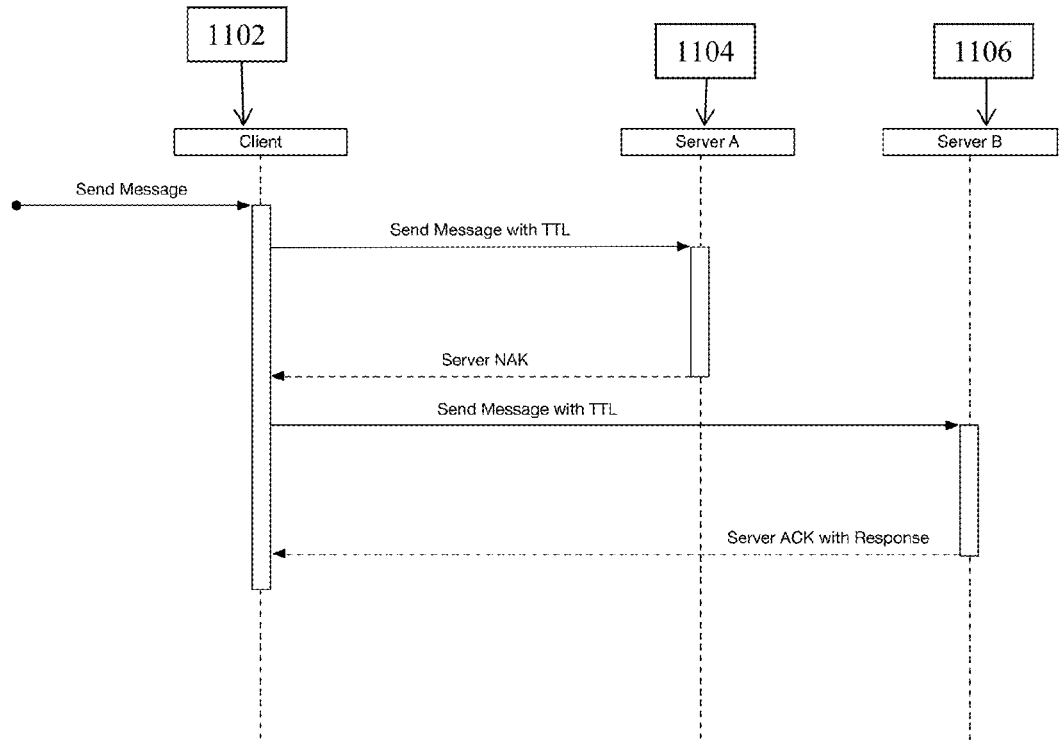
FIG. 11 is another signal diagram in accordance with practicing exemplary embodiments of this disclosure.

FIG. 11 depicts a scenario where the server 1104 NAKs the response and the client 1102 then moves on to the second server 1106 to try and deliver the message. This situation likely occurs when there are not enough available resources on server 1104 to process the request. The process in FIG. 11 begins with client 1102 sending a message with a TTL to server 1104. Server 1104 responds to client 1102 with a NAK indicating that server 1104 is not able to service client 1102. Client 1102 then sends a message with a TTL to server 1106. Server 1106 responds to client 1102 with an ACK and a response.

Figure 12:
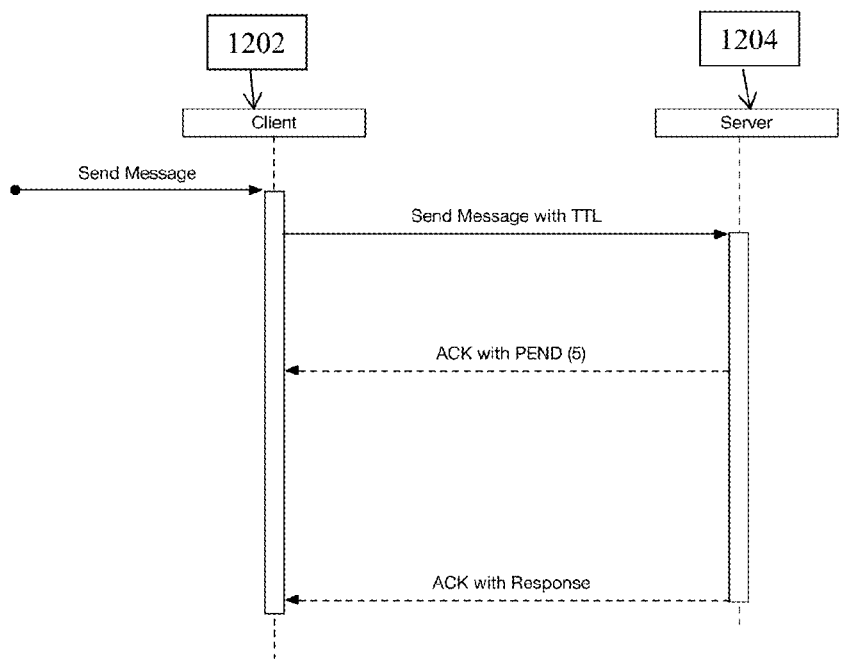
FIG. 12 is another signal diagram in accordance with practicing exemplary embodiments of this disclosure.

FIG. 12 illustrates the case where the server has sufficient resources, but cannot send a response to the request within the specified TTL. This may occur if the message requires a complex calculation, or if there is a dependency on an external process, such as geocoding that requires more time than the TTL. The process begins by the client 1202 sending a message with a TTL to server 1204. Server 1204 is not able to respond to the message before the TTL expires. In this situation, server 1204 responds to the message by sending an ACK with PEND (5) to client 1202. This signifies to client 1202 that server 1202 is guaranteeing it will provide a response in 5 seconds. If it does not, the client 1202 will retry the message on another server. Server 1204 then responds again to client 1202 with an ACK with response to the message. Before server 1204 responds to the client 1202, the server 1204 must validate that the TTL has not expired. This prevents duplicate messages from being propagated. If the TTL expired, then the client has already retried connecting to another server. The server 1204 thus would not send a message because the original message is now invalid.

Additionally, in order to most efficiently handle messages, a client can mark a server 'unavailable' if it does not get a response before the TTL expires. When a server is marked 'unavailable', it will not be sent messages from the client. However, the client can periodically send a test message to the server to determine if the server is still 'unavailable'. Once a server is no longer 'unavailable', the client can mark the server as available and the client will be free to send it messages.

Further exemplary embodiments in accordance with the present disclosure are detailed below:

Embodiment 1

A method of communicating, the method comprising: (a) receiving, by a processor, messages from a plurality of servers forwarded by a plurality of registration servers, wherein the messages include connection information for the plurality of servers; (b) transmitting, by the processor, a first message to one of the plurality of servers based on the received connection information for the plurality of servers, wherein the message includes a timer; and (c) transmitting, by the processor, a second message to a different one of the plurality of servers based on the received connection information for the plurality of servers for the case that the processor does not receive a response to the first message prior to the expiration of the timer.

Embodiment 2

The method according to embodiment 1, wherein the messages from the plurality of servers includes encryption keys for future messages.

Embodiment 3

The method according to embodiment 2, wherein the connection information of the plurality of servers includes at least an internet protocol (IP) address for each of the plurality of servers.

Embodiment 4

The method according to embodiment 3, the method further comprising marking, by the processor, the one of the plurality of servers as 'unavailable' for the case that the second message is transmitted.

Embodiment 5

The method according to embodiment 4, the method further comprising transmitting, by the processor, a test message to the one of the plurality of servers, wherein the test message verifies the availability of the one of the plurality of servers and includes a timer.

Embodiment 6

An apparatus comprising: at least one processor and at least one memory storing computer program instructions, wherein the at least one memory with the computer program instructions is configured with the at least one processor to cause the apparatus to at least: receive, by a processor, messages from a plurality of servers forwarded by a plurality of registration servers, wherein the messages include connection information for the plurality of servers; transmit, by the processor, a first message to one of the plurality of servers based on the received connection information for the plurality of servers, wherein the message includes a timer; and transmit, by the processor, a second message to a different one of the plurality of servers based on the received connection information for the plurality of servers for the case that the processor does not receive a response to the first message prior to the expiration of the timer.

Embodiment 7 the apparatus according to embodiment 6, wherein the messages from the plurality of servers includes encryption keys for future messages.

Embodiment 8 the apparatus according to embodiment 7, wherein the connection information of the plurality of servers includes at least an internet protocol (IP) address for each of the plurality of servers.

Embodiment 9 the apparatus according to embodiment 8, the at least one processor and at least one memory storing computer program instructions further cause the apparatus to at least mark, by the processor, the one of the plurality of servers as 'unavailable' for the case that the second message is transmitted.

Embodiment 10 the apparatus according to embodiment 9, the at least one processor and at least one memory storing computer program instructions further cause the apparatus to at least transmit, by the processor, a test message to the one of the plurality of servers, wherein the test message verifies the availability of the one of the plurality of servers and includes a timer.

Embodiment 11

A non-transitory computer-readable medium tangibly comprising computer program instructions, which, when executed by a processor, causes the processor to at least: receive, by a processor, messages from a plurality of servers forwarded by a plurality of registration servers, wherein the messages include connection information for the plurality of servers; transmit, by the processor, a first message to one of the plurality of servers based on the received connection information for the plurality of servers, wherein the message includes a timer; and transmit, by the processor, a second message to a different one of the plurality of servers based on the received connection information for the plurality of servers for the case that the processor does not receive a response to the first message prior to the expiration of the timer.

Embodiment 12

The non-transitory computer-readable medium according to embodiment 11, wherein the messages from the plurality of servers includes encryption keys for future messages.

Embodiment 13

The non-transitory computer-readable medium according to embodiment 12, wherein the connection information of the plurality of servers includes at least an internet protocol (IP) address for each of the plurality of servers.

Embodiment 14

The non-transitory computer-readable medium according to embodiment 13, wherein the computer program instructions, which, when executed by a processor, further causes the processor to at least mark, by the processor, the one of the plurality of servers as 'unavailable' for the case that the second message is transmitted.

Embodiment 15

The non-transitory computer-readable medium according to embodiment 14, wherein the computer program instructions, which, when executed by a processor, further causes the processor to at least transmit, by the processor, a test message to the one of the plurality of servers, wherein the test message verifies the availability of the one of the plurality of servers and includes a timer.

Other exemplary embodiments of the present disclosure include the embodiments enumerated below.

Embodiment 16

A method for monitoring, the method comprising: (a) locating, by a processor, a location of a first item and a location of at least one second item; (b) creating, by a processor, a virtual geographic perimeter encompassing at least a portion of the first item based on the location of the first item; and (c) recording, by the processor, a first incident when the at least one second item crosses into the virtual geographic perimeter surrounding the first item.

Embodiment 17

The method according to embodiment 16, wherein the first item is an emergency situation.

Embodiment 18

The method according to embodiment 16, wherein the first item is an emergency resource.

Embodiment 19

The method according to embodiment 16, wherein the at least one second item is a user equipment.

Embodiment 20

The method according to embodiment 16, the method further comprising recording, by the processor, a second incident when the at least one second item crosses out of the virtual geographic perimeter.

Embodiment 21

The method according to embodiment 16, the method further comprising transmitting, by the processor, an update to the at least one second item in response to the first incident.

Embodiment 22

The method according to embodiment 21, wherein the update is a warning based on the location of the first item.

Embodiment 23

The method according to embodiment 21, wherein the update is a set of instructions.

Embodiment 24

The method according to embodiment 16, the method further comprising transmitting, by the processor, real-time information from the at least one second item in response to the first incident.

Embodiment 25

The method according to embodiment 16, the method further comprising transmitting, by the processor, indicators to the at least one second item when an at least one third item crosses into or crosses out of the virtual geographic perimeter.

Embodiment 26

The method according to embodiment 16, wherein a size of the virtual geographic perimeter is user defined.

Embodiment 27

An apparatus comprising: at least one processor and at least one memory storing computer program instructions, wherein the at least one memory with the computer program instructions is configured with the at least one processor to cause the apparatus to at least: locate a location of a first item and a location of at least one second item; create a virtual geographic perimeter encompassing at least a portion of the first item based on the location of the first item; and record a first incident when the at least one second item crosses into the virtual geographic perimeter surrounding the first item.

Embodiment 28

The apparatus according to embodiment 27, wherein the first item is an emergency situation.

Embodiment 29

The apparatus according to embodiment 27, wherein the first item is an emergency resource.

Embodiment 30

The apparatus according to embodiment 27, wherein the at least one second item is a user equipment.

Embodiment 31

The apparatus according to embodiment 27, the apparatus is further configured to at least record a second incident when the at least one second item crosses out of the virtual geographic perimeter.

Embodiment 32

The apparatus according to embodiment 27, the apparatus is further configured to at least transmit an update to the at least one second item in response to the first incident.

Embodiment 33

The apparatus according to embodiment 32, wherein the update is a warning based on the location of the first item.

Embodiment 34

The apparatus according to embodiment 32, wherein the update is a set of instructions.

Embodiment 35

The apparatus according to embodiment 27, the apparatus further configured to at least transmit real-time information from the at least one second item in response to the first incident.

Embodiment 36

The apparatus according to embodiment 27, the apparatus further configured to at least transmit indicators to the at least one second item when an at least one third item crosses into or crosses out of the virtual geographic perimeter.

Embodiment 37

The apparatus according to embodiment 27, wherein a size of the virtual geographic perimeter is user defined.

Embodiment 38

A non-transitory computer-readable medium tangibly comprising computer program instructions, which, when executed by a processor, causes the processor to at least: locate a location of a first item and a location of at least one second item; create a virtual geographic perimeter encompassing at least a portion of the first item based on the location of the first item; and record a first incident when the at least one second item crosses into the virtual geographic perimeter surrounding the first item.

Embodiment 39

The non-transitory computer-readable medium according to embodiment 38, wherein the first item is an emergency situation.

Embodiment 40

The non-transitory computer-readable medium according to embodiment 38, wherein the first item is an emergency resource.

Embodiment 41

The non-transitory computer-readable medium according to embodiment 38, wherein the at least one second item is a user equipment.

Embodiment 42

The non-transitory computer-readable medium according to embodiment 38, the computer program instructions further causes the processor to at least record a second incident when the at least one second item crosses out of the virtual geographic perimeter.

Embodiment 43

The non-transitory computer-readable medium according to embodiment 38, the computer program instructions further causes the processor to at least transmit an update to the at least one second item in response to the first incident.

Embodiment 44

The non-transitory computer-readable medium according to embodiment 43, wherein the update is a warning based on the location of the first item.

Embodiment 45

The non-transitory computer-readable medium according to embodiment 43, wherein the update is a set of instructions.

Embodiment 46

The non-transitory computer-readable medium according to embodiment 38, the computer program instructions further causes the processor to at least transmit real-time information from the at least one second item in response to the first incident.

Embodiment 47

The non-transitory computer-readable medium according to embodiment 38, the computer program instructions further causes the processor to at least transmit indicators to the at least one second item when an at least one third item crosses into or crosses out of the virtual geographic perimeter.

Embodiment 48

The non-transitory computer-readable medium according to embodiment 38, wherein a size of the virtual perimeter is user defined.

What is claimed is:
1. A method of aiding emergency response, the method comprising:
 (a) receiving, by a processor, a plurality of data corresponding to a geographic location from a plurality of data sources;
 (b) aggregating, by the processor, the plurality of data;
 (c) determining, by the processor, a first profile and a second profile based on the aggregated plurality of data; and
 (d) transmitting, by the processor, the first profile to a plurality of user equipments and the second profile to at least one user equipment, wherein the at least one user equipment is different from the plurality of user equipments, wherein the first profile comprises traffic navigation information, medical information, predictive information, user specific information, and location information corresponding to the geographic location.

2. The method according to claim 1, wherein the plurality of data comprises emergency information, location information, and incident description information.

3. The method according to claim 1, wherein the plurality of data comprises historic public and private information comprising historic traffic patterns, public records, historic site information, historic consumption patterns, private records, maps and demographics.

4. The method according to claim 1, wherein the plurality of data comprises medical records of a third party.

5. The method according to claim 1, wherein the plurality data comprises real-time information, and wherein the real-time information further comprises medical record release information.

6. The method according to claim 1, wherein the second profile comprises availability information, ability information, and location information of each user of the plurality of user equipments and wherein the second profile further comprises traffic navigation information, medical information, predictive information, and geographic proximity information for an incident and the plurality of user equipments corresponding to the geographic location.

7. An apparatus comprising:
 at least one processor and at least one memory storing computer program instructions, wherein the at least one memory with the computer program instructions is configured with the at least one processor to cause the apparatus to at least:
 receive a plurality of data corresponding to a geographic location from a plurality of data sources;
 aggregating the plurality of data;
 determining a first profile and a second profile based on the aggregated plurality of data; and
 transmitting the first profile to a plurality of user equipments and the second profile to at least one user equipment, wherein the at least one user equipment is different from the plurality of user equipments, wherein the first profile comprises traffic navigation information, medical information, predictive information, user specific information, and location information corresponding to the geographic location.

8. The apparatus according to claim 7, wherein the plurality of data comprises emergency information, location information, and incident description information.

9. The apparatus according to claim 7, wherein the plurality of data comprises historic public and private information comprising historic traffic patterns, public records, historic site information, historic consumption patterns, private records, maps and demographics.

10. The apparatus according to claim 7, wherein the plurality of data comprises medical records of a third party.

11. The apparatus according to claim 7, wherein the plurality of data comprises real-time information, and wherein the real-time information further comprises medical record release information.

12. The apparatus according to claim 7, wherein the second profile comprises availability information, ability information, and location information of each user of the plurality of user equipments and wherein the second profile further comprises traffic navigation information, medical information, predictive information, and geographic proximity information for an incident and the plurality of user equipments corresponding to the geographic location.

13. A non-transitory computer-readable medium tangibly comprising computer program instructions, which, when executed by a processor, causes the processor to at least:
receive a data plurality of data corresponding to a geographic location from a plurality of data sources;
aggregate the plurality of data;
determine a first profile and a second profile based on the aggregated plurality of data; and
transmit the first profile to a plurality of user equipments and the second profile to at least one user equipment, wherein the at least one user equipment is different from the plurality of user equipments, wherein the first profile comprises traffic navigation information, medical information, predictive information, user specific information and location information corresponding to the geographic location.

14. The non-transitory computer-readable medium according to claim 13, wherein the plurality of data comprises emergency information, location information, and incident description information.

15. The non-transitory computer-readable medium according to claim 13, wherein the plurality of data comprises historic public and private information comprising historic traffic patterns, public records, historic site information, historic consumption patterns, private records, maps and demographics.

16. The non-transitory computer-readable medium according to claim 13, wherein the plurality of data comprises medical records of a third party.

17. The non-transitory computer-readable medium according to claim 13, wherein the plurality of data comprises real-time information, and wherein the real-time information further comprises medical record release information.

18. The non-transitory computer-readable medium according to claim 13, wherein the second profile comprises availability information, ability information, and location information of each user of the plurality of user equipments and wherein the second profile further comprises traffic navigation information, medical information, predictive information, and geographic proximity information for an incident and the plurality of user equipments corresponding to the geographic location.

* * * * *